United States Patent [19]
Quinquis et al.

[11] Patent Number: 5,638,377
[45] Date of Patent: Jun. 10, 1997

[54] METHOD OF FORWARDING DATA PACKETS IN A MULTI-SITE NETWORK, A CORRESPONDING COMMUNICATIONS NETWORK, AND A CORRESPONDING INTERFACE MODULE

[75] Inventors: Jean-Paul Quinquis; Joël François; Ridha Hamidi, all of Lannion; Philippe Le Padellec, Loperhet, all of France

[73] Assignees: Alcatel Business Systems; France Telecom, both of Paris, France

[21] Appl. No.: 493,394

[22] Filed: Jun. 21, 1995

[30] Foreign Application Priority Data

Jun. 22, 1994 [FR] France ................... 94-07656

[51] Int. Cl.$^6$ ................. H04L 12/56; H04L 12/66
[52] U.S. Cl. ................. 370/392; 370/397; 370/409
[58] Field of Search ............... 370/60, 60.1, 94.1, 370/58.1, 58.2, 58.3, 79, 80, 82, 83, 99, 54, 110.1

[56] References Cited

U.S. PATENT DOCUMENTS

| | | | |
|---|---|---|---|
| 5,450,406 | 9/1995 | Esaki et al. | 370/60.1 |
| 5,453,981 | 9/1995 | Katsube et al. | 370/79 |
| 5,513,178 | 4/1996 | Tanaka | 370/60.1 |

OTHER PUBLICATIONS

Patent Abstracts of Japan, vol. 17, No. 629 (E-1462) 19 Nov. 1993 & UP-A-05 1999228 (Oki Electric Ind Co Ltd) Aug. 6, 1993.
Patent Abstracts of Japan, vol. 17, No. 328 (E-1385), 22 Jun. 1993 & JP-A-05 037547 (Fujitsu Ltd) Feb. 12, 1993.
Computer Communications, vol. 16, No. 10, Oct. 1993 Jordan Hill, pp. 662-666, W. Chen et al, "Efficient Multicast Source Routing Scheme".

Primary Examiner—Wellington Chin
Assistant Examiner—Huy D. Vu
Attorney, Agent, or Firm—Sughrue, Mion, Zinn, Macpeak & Seas

[57] ABSTRACT

The header of each packet contains a virtual channel identifier. The virtual path identifier is a packet distribution agent enabling a packet to be distributed when the packet is travelling over a public network, and the virtual path identifier is a packet-routing agent enabling the packet to be routed when said packet is travelling over a private network. Each time a packet is transferred from a private network to a public network, routing data contained in the virtual path identifier is shifted to a reserved portion of a virtual channel identifier that is also contained by the packet, and it is replaced by distribution control data. Each time a packet is transferred in the opposite direction, the distribution control data in the packet is replaced by private network internal routing data.

14 Claims, 10 Drawing Sheets

METHOD OF FORWARDING DATA PACKETS IN A MULTI-SITE NETWORK, A CORRESPONDING COMMUNICATIONS NETWORK, AND A CORRESPONDING INTERFACE MODULE

BACKGROUND OF THE INVENTION

The invention generally relates to data interchange in structured communications systems, in which calls are made by interchanging data packets. A particular field of application of the invention is that of systems implementing the ATM (Asynchronous Transfer Mode) technique, in which the interchanged packets are of fixed size, and are referred to as "cells".

More precisely, the invention concerns routing cells (or more generally packets) in a private network, in particular in a network made up of a plurality of mutually distant sites interconnected via a public network.

Conventionally, a packet comprises at least two fields: a header and a data field. The data field contains data that is useful to the call. The header contains, in particular, routing data enabling the packet to be transferred from the transmitter to its destination via various nodes making up the communications network. The header has a predefined format so that it can be interpreted by all of the nodes of the network, and it must be as short as possible, so as to leave as much room as possible available for the data that is useful to the application.

Furthermore, it is known that private networks and public networks have different requirements in terms of routing data, if only because of the much greater number of calls handled by a public network.

The ATM technique provides a two-level hierarchical network organization, namely comprising virtual paths (VP) and virtual channels (VC). Generally, the paths are set up and managed semi-permanently, as are the transmission resources, under the control of mechanisms for administering the public network, whereas the channels are set up under the control of mechanisms for processing calls and connections.

In other words, the paths, which are identified in the header of each cell by a virtual path identifier (VPI) field are managed by the public network only, at distributors. The channels are identified by a virtual channel identifier (VCI) field enabling the cell switching to be managed.

In a private network, only the virtual channel concept is implemented. Therefore, it can be understood that the VPI field is unnecessary in the private network, but that it becomes necessary as soon as a call uses the public network.

A general object of the invention is to provide a method of optimizing use of the bits forming the header of a packet, in particular for routing the packet to its destination.

In this way, an object of the invention is to provide such a method that makes it possible to re-use, at private level, a header field that is provided to be used over the public network only, such as the VPI field of the ATM standard, while guaranteeing the continued existence of this field whenever it is necessary to transfer a packet to the public network.

In other words, an object of the invention is to provide such a method that enables the same field of the header of a packet to have two uses, depending on whether the packet is in a public network or in a private network, and that restores the field each time the packet passes from the private network to the public network, and vice versa.

In other words, an object of the invention is to broaden the possibilities for use of a packet header, without increasing the size of the header, or modifying its structure too significantly.

In this way, a particular object of the invention is to provide such a method that enables packets to be routed to a large number of stations. In particular, an object of the invention is to provide such a method that, in systems using the ATM technique, makes it possible to address a higher number of stations than known methods, whether using conventional routing via the VCI field, or the "self-routing" technique.

In accordance with the ATM standard, each cell entering a switching matrix of the network undergoes processing which consists inter alia in reading its header (more precisely the contents of the VCI field and/or the VPI field) so as to determine that direction in which it must be switched at the output.

Such information is associated with the number of the input multiplex via which the cell arrived so as to constitute the address of the translation memory of the matrix. The read data is constituted firstly by the number(s) of the multiplexes via which the cell is to be transmitted at the output, and secondly by the new VCI (or VPI) code(s). The first operation is referred to as "routing", and the second is referred to as "translation".

An ATM multiplex is designed to convey a large number of simultaneously-routed calls. These calls are routed via virtual connections identified by the VCI fields. On any given multiplex, all of the virtual connections that carry the same VCI belong to the same call.

Since the standard defines a VCI field of 16 bits, the maximum number of virtual connections routed simultaneously on the same multiplex is about 65,000, which corresponds to a translation memory size of 16×65,000 words of (a minimum of) 32 bits for an ATM matrix having 16 incoming multiplexes and 16 outgoing multiplexes.

In addition to the drawback of requiring a large-sized translation memory, that is therefore costly because of the silicon area required, that routing technique implements message interchange (marking) with a control processor during set-up and clearing-down of each connection. Such interchange is necessary with all of the switching matrices situated on the route to be travelled by the cells of the virtual connection to be set up. The number of switching layers that interconnect the terminals between which a call is to be set up may, in some cases, be large because this number depends on the size of the site, on the route followed, and on the topology of the network.

Use of large-sized (e.g. 16×16) matrices is quite compatible with these requirements insofar as:

a) the ratio between the required translation memory volume and the hardware taken up by the matrix (one or two cards) remains very advantageous; and b) the marking stages concern only a limited number of items of switching equipment.

Unfortunately, as soon as various reasons (topology, modularity, maintenance, expandability, etc.) justify implementation of small-sized (or even single-component) switching equipment, the question of reducing the sizes of translation memories becomes relevant.

The self-routing technique is not governed by a standard but it is nevertheless widely used in widely differing forms. In principle, it consists in explicitly coding, in a field of a header of a cell, the list of the numbers of the links via which the cell is to be routed.

The drawback with that technique, which may be referred to as the "consumable label" technique, is that it requires a field having a length that is proportional to the number of switching layers via which the cell is to pass: it must therefore be reserved for small-sized networks.

By way of example, a field of 16 bits makes it possible to code the successive passes through only 4 16×16 matrices (4 bits for coding one output multiplex from 16). This drawback can however be overcome by means of various solutions.

A first solution consists in using the 24 bits represented by the VPI field and the VCI field together. That suffers from two drawbacks, namely it is necessary to provide a specific routing analysis logic circuit in each of the matrices, and it is impossible to superpose a second VCI or VPI routing level.

A second solution consists in encapsulating the 5-byte (standardized size) header with additional bytes, e.g. 3 bytes.

Another solution uses a compound approach: self-routing then translation (i.e. updating the self-routing label), then self-routing, etc.

The cell self-routing technique eliminates the translation memory marking stage, which becomes unnecessary. It also makes it possible if not to simulate the translation memories, at least to reduce their capacities significantly.

Another advantage of self-routing is that it offers, quite cheaply, the possibility of using back-up routes rapidly for transferring data in the event of local breakdowns or of traffic congestion. It is merely necessary to change the contents of the self-routing address in the transmitter terminal in order for the cells of the virtual connection to be forwarded over a different route that can by-pass the obstacle; naturally, after the self-routing address has been stored in the cell transmitter equipment.

Another object of the invention is to provide a method offering the advantages of self-routing, without suffering from the drawbacks thereof.

In particular, an object of the invention is to provide such a method that enables a network to be covered that has a size which is compatible with the requirements of private sites, while maintaining the structural integrity of the fields as defined in the standards, such as the VCI and VPI fields in ATM.

Another object of the invention is to provide such a method that is compatible with all types of network (single or double ring, bus, star, etc.) and with all combinations of networks. In particular, an object of the invention is to provide such a network that makes it simple to interconnect a plurality of sub-networks, either directly or via the public network.

Yet another object of the invention is to provide such a method that enables small-capacity translation memories to be used, thereby making it possible to integrate small-sized switching entities, e.g. in the form of ASIC-type components. Using small-sized switching components offers numerous advantages, such as modularity and mass-producibility, thereby making it possible to optimize manufacturing, installation, and maintenance costs, and to make operating costs linear, and the possibility of implementing widely differing network architectures: in particular, distribution networks can be built using centralized topologies but also geographically distributed topologies, e.g. loops, buses, or trees.

Another object of the invention is to provide such a method that does not require a specific self-routing mechanism, i.e. additional equipment, in the switching matrices. In other words, an object of the invention is to use matrices that comply with the standard, and therefore that are compatible with use in public network multiplexing and switching equipment.

SUMMARY OF THE INVENTION

The invention achieves these objects and others that appear below by providing a method of forwarding data organized in data packets, in a multi-site data-interchange network for data organized in data packets, the network being of the type including at least two mutually distant sites, each of which is organized in private sub-networks including a plurality of terminals that are capable of transmitting and/or receiving packets, and that are interconnected via a distributed public network;

each of said packets comprising a header and a data field, said header containing at least two identifiers defining two access hierarchy levels as seen from said public network, namely a first identifier referred to as the "virtual channel identifier" (VCI) enabling switching of said packets to be controlled, and a second identifier referred to as the "virtual path identifier (VPI) enabling distribution of said packets to be controlled in said public network;

in which method two tasks are assigned to said virtual path identifier, namely:
controlling distribution of the packet while it is travelling over said public network; and
managing a routing mechanism for routing the packet while it is travelling over one of said private sub-networks;

in which method, each time a packet is transferred from one of said private sub-networks to said public network, routing data contained in said virtual path identifier is shifted to a reserved portion of said virtual channel identifier, and is replaced by distribution control data;

and in which method, each time a packet is transferred from said public network to one of said private sub-networks, said distribution control data is erased, and said self-routing data contained in said reserved portion of said virtual channel identifier is shifted to said virtual path identifier.

In other words, a zone of the header of each cell, or packet, and more precisely of the VCI, is reserved so as to serve as a temporary storage zone for temporarily storing the "private" contents of the VPI, so long as the cell is travelling over the distributed public network. Each time the cell is transferred from the public network to the private network, and vice versa, the VPI is modified so as to correspond to the task that is assigned to it.

In this way, addressing over the network is facilitated because both fields (VPI and VCI) can be used. For example, this makes it possible to define two addressing levels in the private network;

In a preferred implementation of the invention, said packets are ATM cells, and:
said virtual path identifier is constituted by 12 bits, the four most significant bits being forced to a predetermined value (in other words, only the eight least significant bits are used); and
said virtual channel identifier is constituted by 16 bits, the eight most significant bits being reserved for storing said self-routing data.

It is these eight reserved bits that enable the method of the invention to be implemented.

Advantageously, said mutually distant sites comprise a main site and at least two secondary sites, any call between two of said secondary sites going via said main site.

As appears more clearly below, this technique makes it possible to reduce the number of permanent paths to be set up in the public network.

Preferably, the operations of modifying the contents of said virtual path identifier are performed physically in dedicated interface equipment on each site.

In a preferred implementation of the invention each private sub-network includes:

a plurality of switching nodes connected together in pairs via at least one data interchange medium, each of said nodes serving a respective concentrator, each concentrator managing at least one data processing terminal capable of transmitting and/or receiving data packets; and an interface module providing the connection between said private sub-network and said public network;

and the method includes the following steps:

a data packet is transmitted by a transmitter terminal to its associated concentrator, referred to as the "transmitter" concentrator, and on to a receiver terminal, said packet carrying a local VCI (VC-La) and a local VPI (VP-La) allocated by said transmitter terminal for the duration of a call;

said local VCI is translated in said transmitter concentrator into a VCI (VC-Sa) allocated by said receiver terminal for the duration of a call;

said local VPI is translated in said transmitter concentrator into a VPI (VP-Sa) allocated permanently to said receiver terminal;

if said receiver terminal belongs to the same sub-network as said transmitter terminal:

said packet is routed to the "receiver" concentrator associated with said receiver terminal, via said switching nodes, by analyzing said VPI; and the packet is routed to said receiver terminal by analyzing said VCI in said receiver concentrator; and if said receiver terminal belongs to another sub-network:

said packet is routed to the interface module of the sub-network of said transmitter terminal, via said switching nodes, by analyzing said VPI;

in said interface module, the contents of said VPI (VP-Sa) are shifted to a reserved portion of the VCI field, and management information (VP-Bx) concerning managing the distribution over the public network is written in the VPI field;

said interface module transmits said packet to the sub-network of said receiver terminal via said public network;

said packet is received in the interface module of the sub-network of said receiver terminal;

in said interface module, the contents of said reserved portion of the VCI field are shifted to said VPI (VP-Sa);

said packet is routed to the "receiver" concentrator associated with said receiver terminal via said switching nodes, by analyzing said VPI (VP-Sa); and said packet is routed to said receiver terminal, by analyzing said VCI in said receiver concentrator.

Advantageously, said routing data placed in said virtual path identifier is an identifier designating at least one receiver terminal, each of said terminals having an identifier which is specific to it in a given sub-network;

each switching node is associated with:

a memory containing at least one group of at least one identifier corresponding to a set of at least one terminal associated with said node; and a switching matrix associating at least one input with at least two outputs, namely:

at least one first output corresponding to at least one of said stations associated with said node; and at least one second output corresponding to the following node on said switching unit;

and each matrix receiving a packet systematically selects one of said second outputs of the switching matrix if the identifier of the packet does not correspond to any of the identifiers contained in the memory, and one of said first outputs otherwise.

This routing technique offers several advantages. In particular, it makes it simple to address a large number of nodes. It is based on using matrices that are identical to those used elsewhere in ATM networks. Finally, it requires no action to be taken on the contents of the cells in each node, and it merely requires switching to be performed.

In a preferred implementation, at least one of said sub-networks includes at least two switching units, each switching unit including a plurality of switching nodes interconnected in pairs via at least one data interchange medium, and at least one link node for linking to another switching unit, via a link bridge;

and said identifier comprises two portions:

a first portion designating the destination switching unit; and a second portion designating the destination terminal in said destination switching unit;

so that, in each link node, the following steps are performed:

said first portion is analyzed; and if the packet is to be transmitted via said link node to another switching unit, said first portion is modified accordingly, and said packet is transmitted.

In which case, advantageously, each switching unit uses the same set of identifiers, corresponding to said second portion, and a predetermined value is added to said identifiers, the predetermined value corresponding to said first portion, to designate the destination switching unit.

Preferably, the method provides at least one identifier enabling the packet in question to be broadcast to at least two receiver terminals. In this way, it is possible to broadcast only, although it is generally considered that the self-routing technique is not compatible with broadcasting only.

Naturally, the invention also provides data packet communications networks implementing the above-described method.

Advantageously, in such a network, said switching matrices are similar to those used in the concentrators of said network, and the corresponding memories include a fixed addressing table.

In a preferred embodiment, at least some of said switching units of the network are organized using topography having two counter-rotary rings.

Finally, the invention also specifically provides the interface modules providing connection between a private sub-network and the public network, as implemented by the above-described method.

BRIEF DESCRIPTION OF THE DRAWING

Other characteristics and advantages of the invention appear more clearly on reading the following description of a preferred implementation of the invention given by way of non-limiting example, and with reference to the accompanying drawings, in which:

FIG. 5 concerns cell interchange inside the main site;

FIG. 6 shows the case of two connections set up simultaneously from the main site to the same terminal of a remote unit;

FIG. 7 applies to the case of two connections to the same terminal of the main site from two remote terminals; and FIG. 8 shows the case of a connection between two terminals belonging to different remote units, via the main site;

DETAILED DESCRIPTION OF THE INVENTION

The invention concerns private local area networks such as company sites, campuses, metropolitan area networks (MAN), etc., and more particularly multi-site networks in which a plurality of sites are interconnected via a public network.

It applies to network architectures based on packet interchange, in particular those based on the ATM technique, which is described in particular in special editions 144 and 145 of "l'Echo des Recherches" printed in the second and third quarters of 1991 by the "Centre National d'Etudes des Télécommunications" and the "Ecole Nationale Supérieure des Télécommunications".

Figure 1:
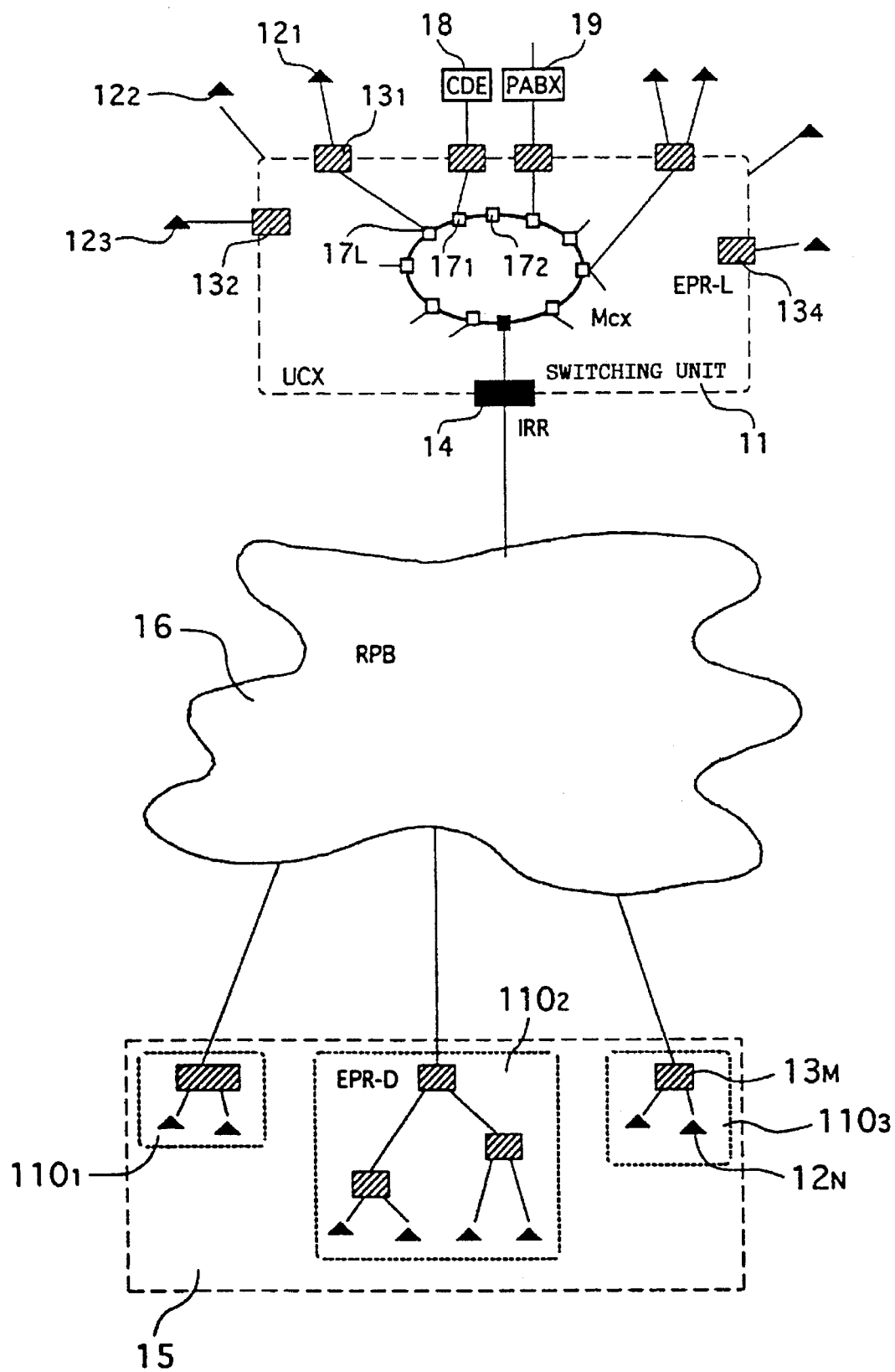
FIG. 1 shows a multi-site network of the invention, comprising one main site and three remote sites interconnected via the distributed public network.

An example of such a network to which the invention applies is shown in FIG. 1. The network in question is made up of a set of switching units (UCX) 11 that may be mutually meshed (a single UCX is shown in FIG. 1). The terminal equipment $12_1$ to $12_N$ (workstations, multimedia terminals, bridges, routers, public network access equipment, control and administration members, etc.) is connected to peripheral connection equipment (EPR) $13_1$ to $13_M$. The generic term "terminal" is used below to designate any type of terminal equipment.

An EPR $13_i$ is capable of concentrating (or multiplexing) an arbitrary number of terminals $12_j$. This number is limited by the data-rates of the terminal links. By way of example, it may be set at 16 (this has no incidence on the provisions of the present invention).

The UCXs and the EPRs use a single type of ATM switching element: a 4×4 matrix (MCX) that is capable of switching cells on the basis of analysis of an 8-bit VPI field or of an 8-bit VCI field. The choice is determined by the hardware or software configuration on switching on the module. As described below, other modules enable action to be taken on the fields of the headers of the cells without performing switching functions.

The installation 11 is connected to the public network via equipment referred to as a "public network connection interface" (IRR) 14.

A multi-site private network includes certain items of equipment 15 that are remote but that can be interconnected via the distributed public network (RPB) 16, such equipment being located at distances that can exceed the size of a national network. Such items of equipment may be:

terminals $12_N$;

terminal concentrators $13_M$; or switches.

In such a private network, only the main site 11 performs the above-mentioned procedures. In other words, the public network 16 is completely transparent to signalling messages between the peripheral equipment and the control members situated on the main site. Everything takes place as if the RPB 16 did not exist. Indeed, an object of the invention is to cause the cells to be adapted before they pass through the RPB, and then to be restored after passing therethrough.

The architecture in question therefore includes the following entities:

one main site 11 constituted by a connection unit (set of ATM switches $17_1$ to $17_L$) to which the local EPRs $13_1$ to $13_M$ and an IRR 14 are connected; the local EPRs (EPR-L) connect peripheral equipment $12_1$ to $12_N$: multimedia terminals, control members 18 (administration and call processing), access bridges providing access to a PABX 19, to existing local area networks; and remote units $110_1$ to $110_3$ constituted by one or more concentrators EPR-D $13_M$; an EPR-D is designed to connect the same peripheral equipment as an EPR-L $13_4$ except for control members (thereby taking away from it any autonomy with respect to call management).

The transmission links between the various entities of the multi-site installation and the RPB are based on the SDH standard. The links are of the virtual type, they are referred to as "virtual paths" (VP), and they are identified by VPI codes carried by the headers of the ATM cells.

The VPs are reserved links characterized by a peak data-rate that must not be exceeded by the user. The main site sees each remote unit via a VP: each VP is identified by a VPI code and by a peak data-rate that may differ from one unit to another.

Each remote unit sees the main site via a single VP that is also characterized by a peak data-rate.

The VPs are allocated and administered by the operator of the public network, and the private user is charged on the basis of the VPs that said user rents from the operator.

A multi-site network may be modified at any time by removing a unit, or by adding additional units. Naturally, these operations take place under the control of the public operator. Such modifications also involve action being taken on the administration of the multi-site private network, but they remain simple to manage.

The maximum number of remote units depends essentially on the data-rate resources that the operator can supply to the user, and also on the level of investment that the user is ready to make.

To summarize, the multi-site network of the invention is similar to a "master-slave" type architecture, the master being represented by the main site, and the slaves being represented by the remote units. In particular, this structure offers the following advantages:

it lends itself very well to private installations having one main center surrounded by small geographically dispersed installations: offices, subsidiaries, branches, etc.;

with respect to managing the VPs of the distributed network, it can be observed that the virtual topology is of the star type: there are as many VP links as there are remote entities, the links converging towards the access multiplex of the main site; unlike a multi-site network with autonomous sites for which the various sites must be meshed, which represents a more costly approach to rental of rented VPs;

calls between remote units must be switched at main site level, whereas calls between peripheral equipment connected to the same concentrator (EPR-D) may be established locally, with only call processing being obliged to "go up" as far as the main site; and a remote unit possesses only a very small amount of operating autonomy, and this gives it the advantage of being less costly with respect both to initial investment and to management expenses.

Figure 2:
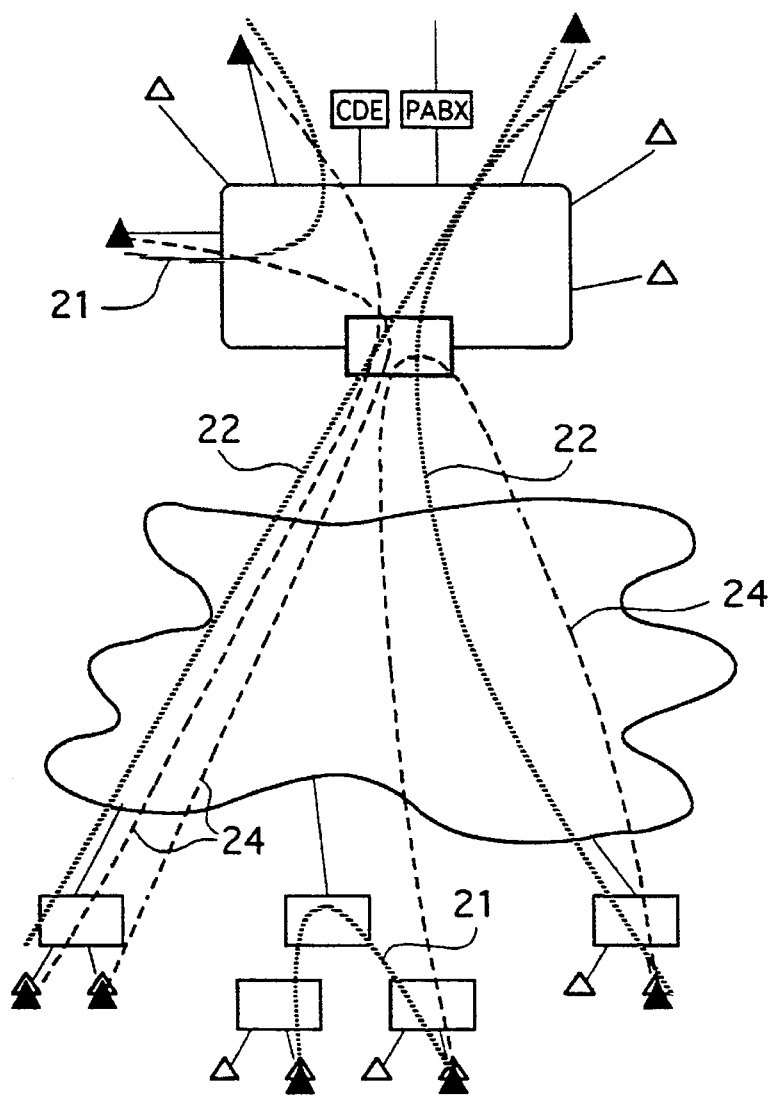
FIG. 2 shows the various types of connection that it must be possible to set up in the network shown in FIG. 1.

The method of the invention must therefore make it possible to achieve simultaneously in particular the virtual connections shown in FIG. 2:

connection 21 between two terminals connected to the main site (SP) 11 or to a remote unit, without passing through the distributed public network (RBP);

connection 22 between a terminal of the SP and one or more terminals connected to the SP via the RBP;

connection 23 between a remote terminal and one or more terminals on the SP, via the RBP; and connection 24 between remote terminals, with the call passing twice through the RBP.

The method of the invention aims to provide multi-site private networks as defined above in an environment having a public network that is distributed at VP level. The invention also concerns the technique to be implemented to enable the distributed public network to be inserted such that it is transparent:

to the internal signalling protocols;

to the administration procedures; and to the connections set up between the various terminals.

The general principle consists in acting via hardware on the fields of the headers of the cells so that the headers comply with the routing:

in the public network when they leave either the main site or a remote unit; and in the main site or in a remote unit when they leave the RPB.

Figure 3:
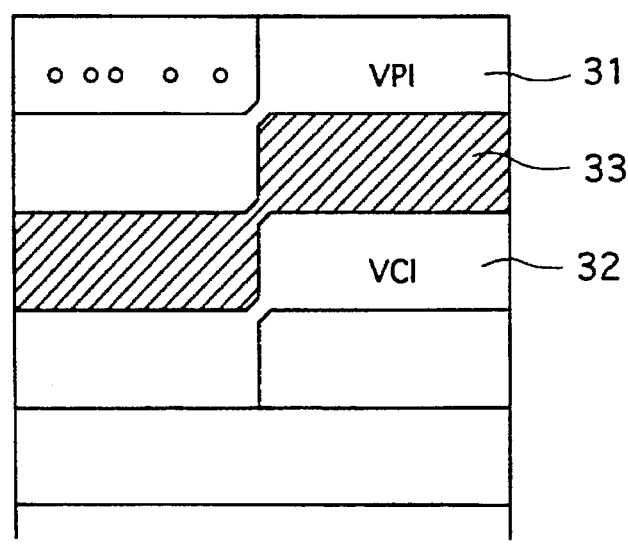
FIG. 3 shows the beginning of the header of an ATM cell, in accordance with the method of the invention, with a shift zone enabling the VPI field to have two uses.

The ATM standard provides that the header of each cell includes in particular, as shown in FIG. 3 (showing the beginning of the header of a cell) a 12-bit VPI field 31, followed by a 16-bit VCI field 32.

In accordance with the invention, the VPI and VCI fields are subjected to particular constraints:

the connections are identified at the terminal equipment by analyzing the VCI field 32 which must be limited to 8 bits, the most significant eight-bit byte being coded to zero; and the 4 most significant bits of the VPI field 31 are coded to zero.

Figure 4:
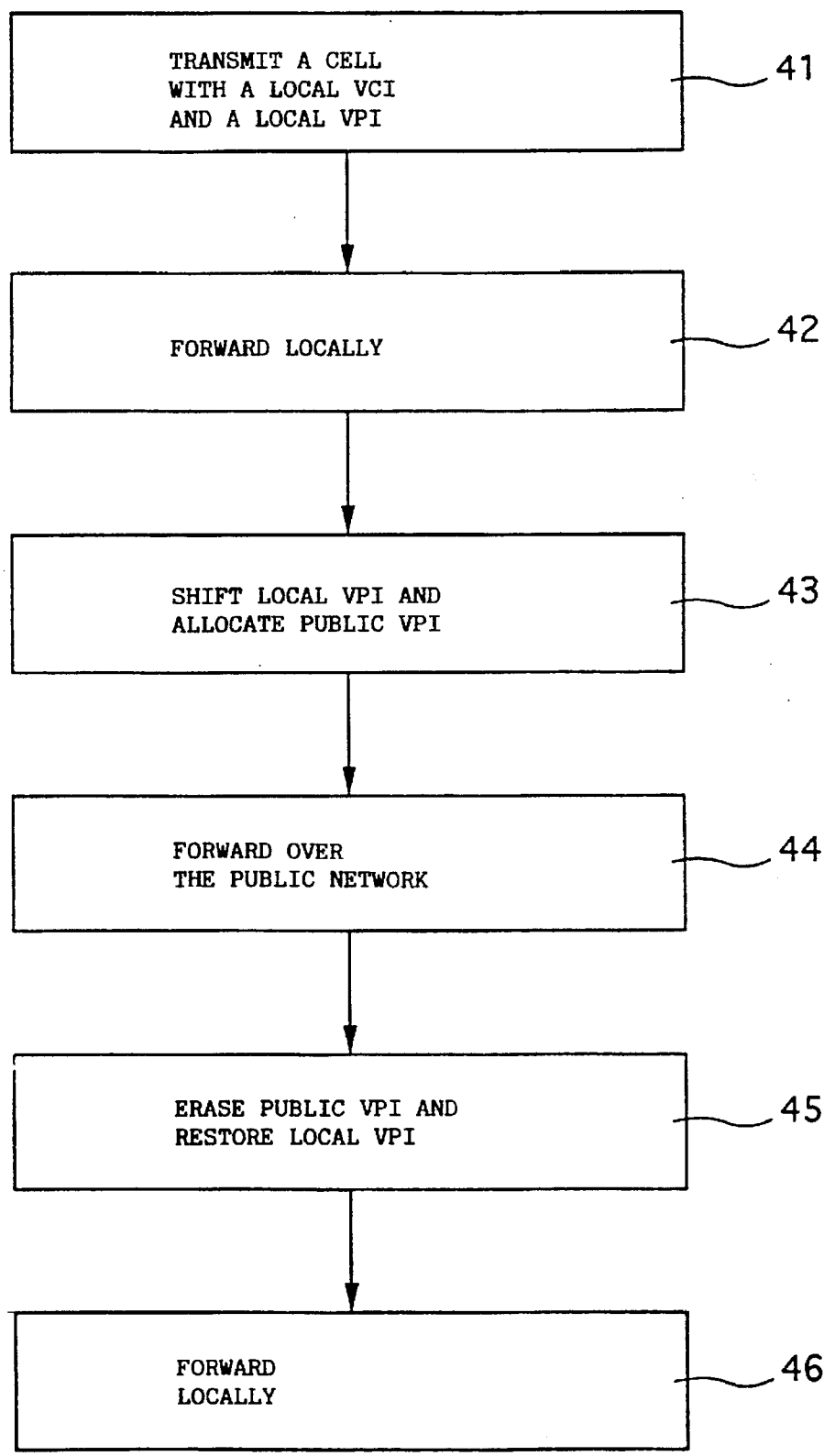
FIG. 4 is an overall flow-chart of the method of the invention, using the cells shown in FIG. 3.

These constraints make it possible to provide a shift zone 33 used for implementing the method of the invention, as shown in FIG. 4 which gives the main outline of the method.

The method comprises the following steps:

a cell is transmitted 41 with a local (or private) VCI and a local (or private) VPI, i.e. that can be used on the private network;

the cell is forwarded 42 over the portion of private network from the transmitter to a connection node for providing connection to the distributed public network;

in this connection node, the private VPI is shifted to the zone 33 reserved for that purpose, and a public VPI is written (43);

the cell is forwarded 44 (distributed) over the public network, by means of the public VPI;

on reception in a connection node of the portion of the private network that contains the destination, the public VPI is erased, and the private VPI stored in the zone 33 is restored by being shifted (45); and the cell is forwarded 46 to its destination.

In the preferred implementation of the invention that is described in more detail below, forwarding and routing the cells implements both the VP level and the VC level:

in the UCXs, routing is performed by analyzing the contents of the VPI fields of the cells, using a technique that can be likened to the self-routing mode insofar as the code contained in the VPI field identifies a physical destination address; and in the EPRs, switching is performed conventionally by analyzing the VCI field, but it differs from the switching performed by the VC switches in the public network insofar as the contents of VPI fields are not taken into account, which means that in this case, at the input of an EPR, all of the VCI codes are different on each multiplex.

In particular, the technique offers the following advantages:

marking the set-up connections call-by-call is performed only at the ends (in the EPRs), which offers advantages in terms of protocol simplicity and rapidity, and improved back-up, compared with procedures requiring marking to be performed in all of the switching matrices that exist on a link between the terminals to be interconnected virtually; and since the connections are identified by VCI chosen by the destination EPRs, the number of connections that can be set up simultaneously is very large.

Figure 5:
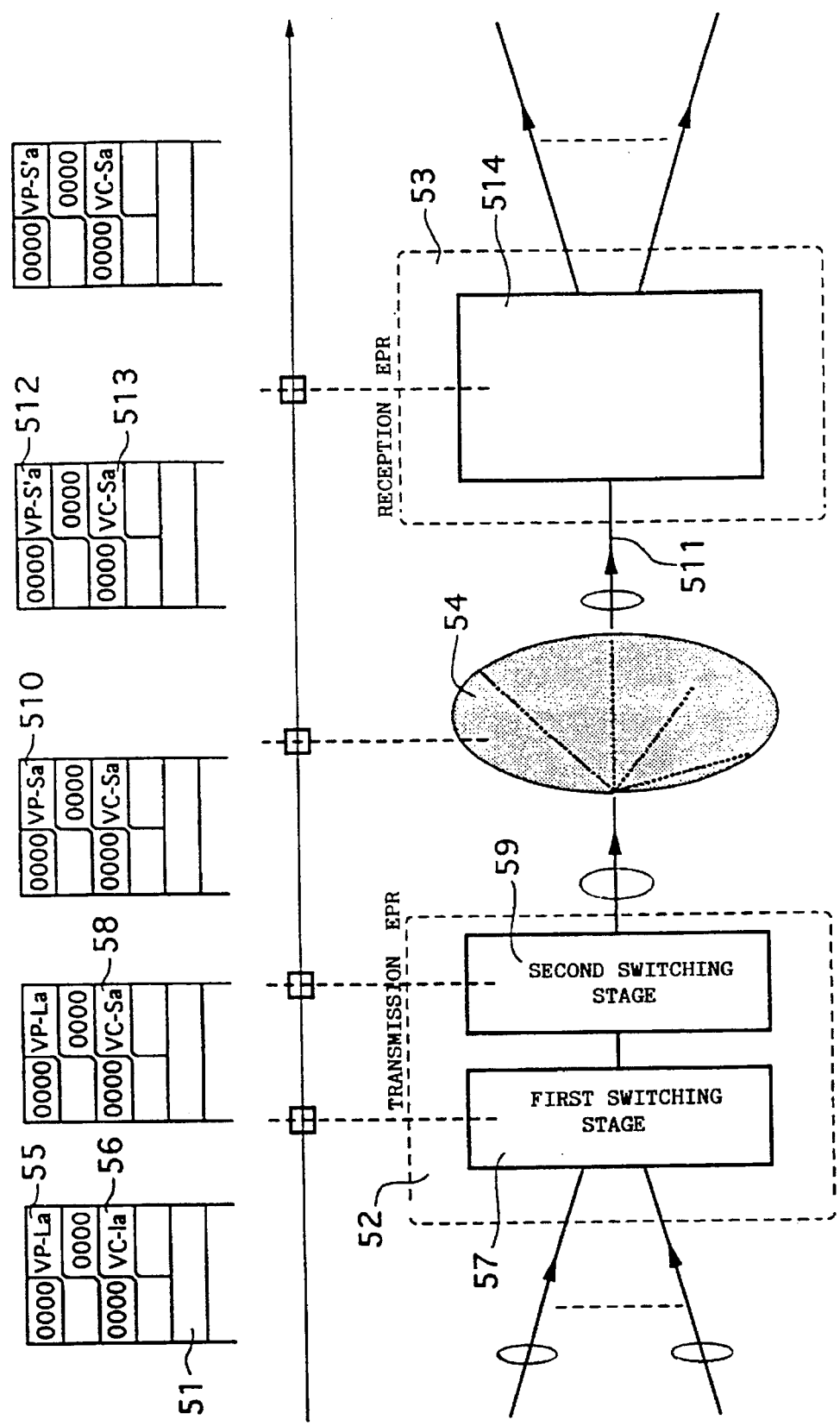
FIGS. 5 to 8 show the FIG. 4 method, in a particular implementation, and more particularly.

Firstly, cell routing within the main site is described with reference to FIG. 5.

Consideration is given to a cell 51 travelling from a transmission EPR 52 (EPR-e) to a reception EPR 53 (EPR-r) via the switching network 64.

At the source end, the cell 51 carries a local VPI 55 (VP-La) allocated by the EPR-e 52 on setting up the connection. It carries a local VCI (VC-La) also allocated by the EPR-e.

In the first switching stage 57, the cell is switched to a common multiplex with translation into a VCI 18 being performed, which VCI has been allocated by the destination EPR-r 53. No further change takes place in this VC-Sa until it arrives at its destination: in this way conflict is avoided insofar as it is always the reception end which allocates the VCI codes to each connection.

It is recalled that VP-La, VC-La and VC-Sa are allocated for the duration of the call only.

In a second stage 59 of the EPR-e 52, the VPI code is translated into a VP-Sa code 510 which is specific to the target direction, i.e. that of the EPR-r. This code is permanent and it is the same for any source calling the same destination.

Switching in the switching network 54 is performed by analyzing the contents of the VPI field 510. It is recalled that all of the virtual paths are set up permanently inside the network, a target direction is identified by a VPI code (a second code identifying a second route is provided for back-up or traffic-distribution reasons). This type of routing is close to the self-routing technique.

All of the cells coming from different sources and going to the same EPR-r 53 are multiplexed on the EPR-r access multiplex. They all carry the same VPI code VP-S' a 512, and only the rVCI field 513 makes it possible to identify that connection to which they belong.

By analyzing the code 513 in the switching modules 514 of the EPR-r, it is possible to switch them to the destination output multiplex. It is the terminal which demultiplexes any connections addressed to it simultaneously, such demultiplexing also being performed by analyzing the VCI field.

Naturally, the process is absolutely identical for the other direction of the connections, with the EPR-e then acting as the EPR-r, and the EPR-r then acting as the EPR-e. However, it should be noted that the VCI and VPI codes are not allocated symmetrically at the ends, i.e. for a both-way call which implements two virtual connections (one per direction), for a given end, the outgoing and incoming VPI codes and VCI codes may differ.

The invention is particularly advantageous when a remote unit is to be connected to the main site, or to another remote unit. A description is given below of the operations performed on the fields of the headers of cells in order to prepare them for transiting via the distributed public network. These operations are entirely performed by hardware in specific modules contained in interface equipment: the IRR for the interface between the main site and the RPB, and the EPR-D for the remote units.

Figure 6:
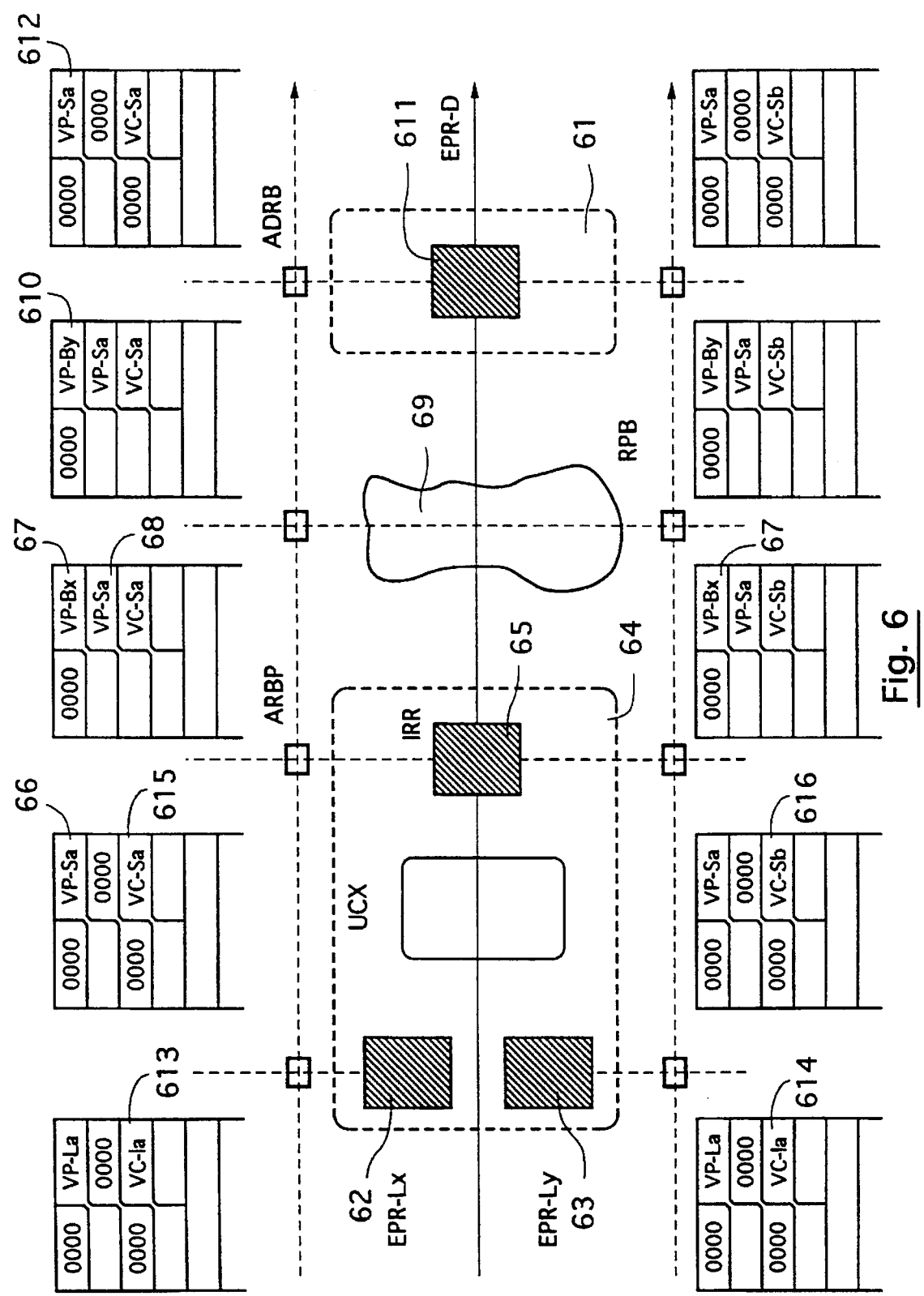

FIG. 6 concerns the case of two connections set up simultaneously towards the same unit 61. It shows the contents of the various fields of the header for each reference point of the link between the transmitter terminal and the receiver terminal.

The novelty lies essentially in the passage through the IRR 65. The functions performed are as follows:

the private VPI code (referenced VP-Sa) 66 is translated into a VPI (referenced VP-Bx) 67 reserved for the distributed public network; and the private code VP-a 66 is simultaneously transferred to the place 68 of the most significant byte of the VCI field.

This operation is performed in the hardware main module of the IRR 65 referred to as the "access to the distributed network from the main site" (ARBP).

It should be noted that this operation is made possible only because, by assumption, the multi-site installation uses only the 8 least significant bits of the VCI code.

The RPB network 69 preforms the routing on the basis of the VPIs, the VPI codes generally being translated, it is assumed that the cell arrives in the remote unit with the VPI referenced (VP-By) 610.

As the cell passes through a module 611 in the EPR-D 61, the private VPI code 612 is restored by shifting the contents of the most significant byte of the VCI field to the VPI field. This hardware module 611 is referred to as the "access to a remote unit from the distributed network" (ADRP).

It should be noted that the cells that have different origins (EPR-Lx 62 and EPR-Ly 63) carry the same VPI codes (VP-Bx) 67 and (VP-By) 610 at RPB level because they are conveyed by the same VP in the distributed public network 69.

Naturally, however, the VC-La 613 and 614 of each EPR-L 62 and 63 are translated in different ways (VC-Sa 615 and VC-Sb 616) so as to identify each connection.

Figure 7:
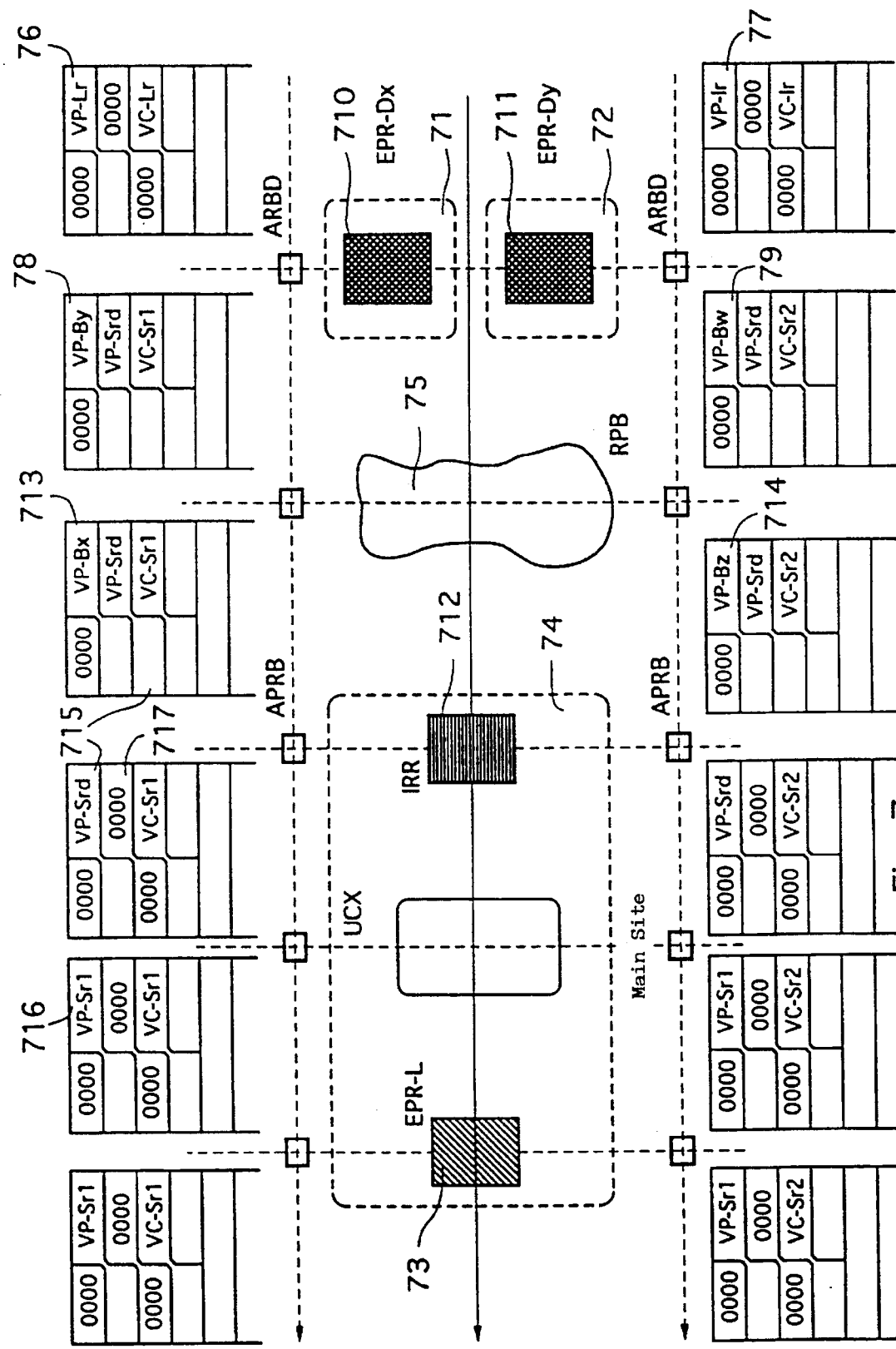

FIG. 7 shows the routes taken by cells from 2 distinct EPR-Ds (EPR-Dx 71 and EPR-Dy 72) to an EPR-L 73 of the main site 74. Compared with the above-described case, it can be observed that there are no IRRs in the EPR-Ds 71 and 72, and that they must perform the functions of adapting the cells to the public network 75.

In this case, such adaptation involves:

translating a local VPI code 76, 77 (referenced VP-Lr) into a VPI code of the RPB (referenced VP-By 78 or VP-Bw 79 depending on the EPR in question); and simultaneously inserting the VPI code (referenced VPS-rd) that is to be used in the main site to forward the cell to the destination EPR-L into the most significant byte of the VPI field.

This operation is performed in a hardware module (710, 711 that is quite similar to module ARBP, and that is referred to as the "access to the distributed network from a remote unit" (ARBD).

As the cells pass through a module 712 in the IRR of the main site 74, the contents of the headers of the cells are restored so that said cells are switched in the main site towards the target EPR-L.

This involves:

removing the RPB routing VPI code (in this example VP-Bx 713 or VP-Bz 714) and replacing it with the private VPI code (VP-Srd in this example); said private VPI code may itself be translated again (716) inside the main site; and writing the most significant byte 717 in the VCI field with the value 0.

A connection between two remote units is now described with reference to FIG. 8.

This type of connection represents an important element of the invention. A connection between two remote units 81 and 82 necessarily goes via the main site 83 and passes twice through the RPB 85. More precisely, switching takes place in the IRR so as not to burden the resources of the main site 83 unnecessarily.

The other alternative which consists in setting up permanent VP-type paths in the RPB between each pair of remote units has been intentionally rejected insofar as it requires a very large number of reserved VPs (full interconnection of N units taken in pairs requires N(N−1)/2 VPs).

Figure 8:
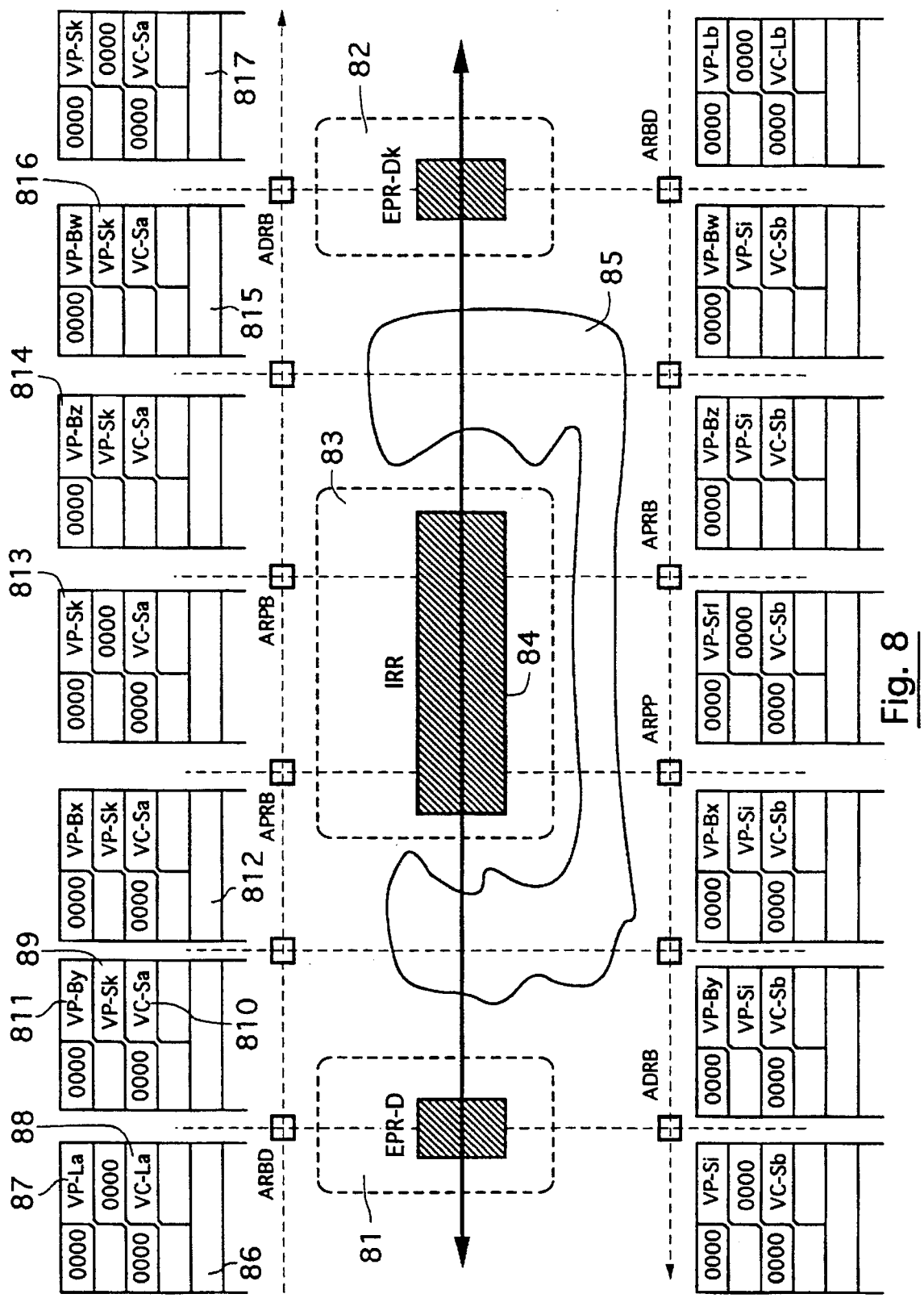

FIG. 8 shows the routes taken by the cells between 2 remote units (EPR-Di 81 and EPR-Dk 82).

It can be observed that, in this example, the headers of the cells are acted on twice at main site level: firstly when they arrive in the IRR, and secondly when they leave it.

It is as if both part-halves of the above-described connections were placed end-to-end.

In this way, the headers undergo the following transformations: in the direction going from EPR-Dj 81 to EPR-Dk 82 (the process in the other direction is symmetrical, and is therefore not described in detail):

the cell 86 is transmitted by a transmitter terminal to EPR-Dj with a local VP-La 87 and a local VC-La 88;

the VP-La 87 is translated into a private VPI VP-Sk 89 and it is then shifted to the most significant byte of the VCI by the ARBD module of the EPR-Dj 81;

the VC-La 88 is translated into a private VCI VC-Sa 810 by the ARBD module of the EPR-Dj 81;

the VPI-La 87 is translated into a public VPI VP-By 811;

the cell 812 is transmitted over the RPB 85 to the IRR of the main site 83;

the APRB of the IRR shifts the private VPI VPI-Sk 813 to the VPI field;

the private VPI VP-Sk 813 is shifted to the most significant byte of the VCI by the ARPB module of the IRR 84;

the VPI-Sk 813 is translated into a public VPI VP-Bz 814;

the cell 815 is transmitted over the RPB 85 to the EPR-Dk-82;

the ADRB of the EPR-Dk shifts the private VPI VP-Sk 816 to the VPI field; and the cell 817 is forwarded to the destination terminal.

The invention also proposes a particularly advantageous mode of forwarding cells in a main site or in a remote unit by using the VCI and the private VPI released by the above-described method.

This technique is based on a mechanism implementing:

1. self-routing by using the contents of the VPI field in the center of the system (the switching network); and
2. VCI routing by using the 8 least significant bits only (from a field of 16 bits) in the multiplexing and demultiplexing peripheral connection equipment.

In this way, a cell transmitted by a transmitter terminal to a destination terminal is routed successively:

by VCI (conventionally) in the transmitter-end connection equipment;

by self-routing (using the VPI field) in the switching center; and by VCI again, in the reception-end connection equipment.

The switching entities (matrices) used are identical in both levels. The translation memory is the same: in self-routing, said memory is addressed by the contents of the VPI field of the header, and in VCI routing, it is addressed by the contents of the VCI field. The choice of operating mode of a matrix may be made in two ways:

implicitly by programming in the matrix on initialization; or explicitly by positioning a bit in the header of each cell and analyzing the bit in the matrix.

Since both the VCI field and the VPI field have the same length (8 bits), the translation memory (having a capacity of 1,024 words) is very easy to integrate.

With this technique, in order to set up a virtual connection, it is necessary to manage 2 identifiers for a given direction:

the self-routing address (contained in the VPI field) calculated in the control member on the basis of the physical identifiers of the terminals between which the call is to be set up; the calculation algorithm is very simple and is described below; and the VCI code allocated by the destination end, and chosen from those of the available 256 codes which are unused.

The process of setting up the virtual path is then performed in each of the ends to which the calling terminal and the called terminal are connected.

Such marking is performed in the form of a very small number of processor interchange operations insofar as they remain localized at the periphery: the number of switching matrices concerned is therefore very small. In particular, no action is necessary at the matrices in the switching system.

The call is set up once all of the virtual connections that make up said call have been set up: a single connection if the call is one-way, two connections if it is a both-way call, and several connections for more complex calls which may or may not be symmetrical.

The above-described self-routing principle using the VPI field requires an initialization stage for initializing the network, and more precisely the switching portion, i.e; the portion of the network in which the cells are self-routed. This operation is performed before the installation is put into service, as soon as it is switched on.

It is performed under the control of a processor, and it consists in updating the translation memories of all of the switching matrices: the information to be loaded is output by a configuration table the contents of which can change during the life of the system as a function of the physical modifications to which the network is subjected: extension, removal, re-configuration, etc. Any change in then contents of a table causes all or part of the network to be re-initialized, thereby updating the contents of the translation memories of all of the switching matrices concerned. The following description of the principles as applied to a network architecture design outlines the nature of the information to be loaded.

The number of processors varies as a function of the size of the network. Generally, it is accepted that each geographical zone of a given site is served by a switch, and that this switch is under the control of a control processor.

Figure 9:
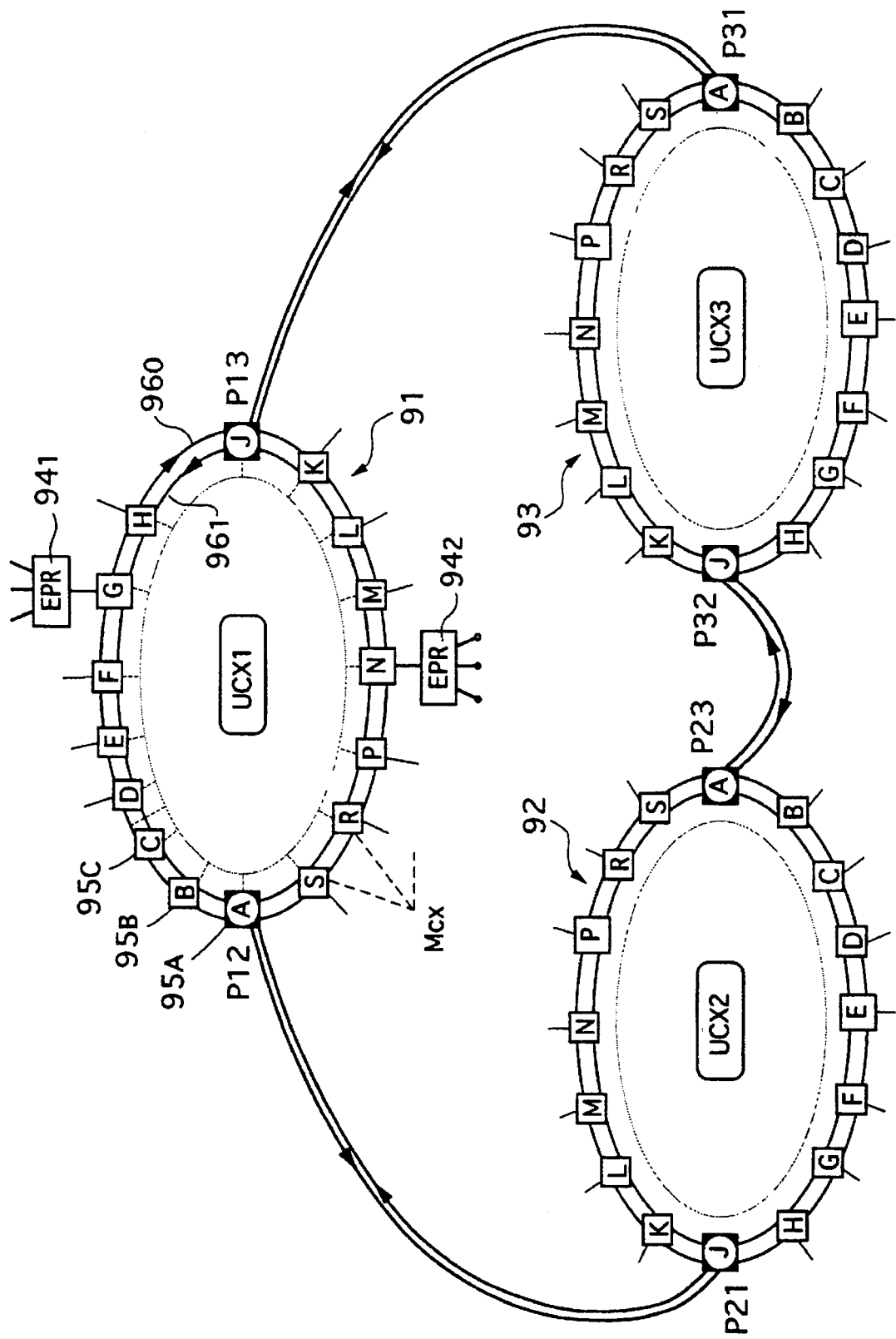
FIG. 9 illustrates the architecture of a medium-sized network design to which the mechanism of the invention is applied.

In order to illustrate the principles implemented, consideration is given to a medium-sized network architecture design to which the mechanism of the invention is applied as shown in FIG. 9. This network is physically made up of 3 switching units (referenced UCX1 91, UCX2 92, and UCX3 93) meshed in pairs. Each UCX to which terminal connection equipment (EPR) 94$i$ is connected covers a local zone of the site. The advantage of self-routing is particularly apparent in network architectures made up of long chains of switching equipment, and in particular in distributed topolologies. That is why the UCXs 91, 92, 93 are loop structures having two counter-rotary rings $96_0$, $96_1$ comprising 16 ATM nodes 95$i$.

FIG. 9 shows the architecture design with the various constituent elements being referenced using referencing conventions:

for each UCX, the 16 elementary ATM switching matrices 95$i$ (MCX) are referenced from (A) to (S), with (A) and (J) designating bridges;

the bridge MCXs are also referenced Pxy, where $\underline{x}$ designates the number of the UCX to which the MCX belongs, and $\underline{y}$ designates the UCX to which it is connected.

The peripheral connection equipment 94$i$ is referenced EPR.

It should be noted that the MCXs are 4×4 ATM matrices interconnected in loops, and the multiplexes ranked 4 in the loops are not used.

The numbers of possible routes between pairs of EPR are:

2, between EPRs in the same UCX;

4, between EPRs in different UCXs with direct access; and 8, between EPRs in different UCXs with transit via the third UCX.

By using all of the possibilities, the number of routes between 2 EPRs belonging to different UCXs may be as much as 12. It is recalled that multiple routes constitute a very advantageous characteristic enabling the network to withstand certain types of breakdown, while being easy for the self-routing technique to operate.

With the self-routing label using the VPI field having a length of 8 bits, a number of VPI codes limited to 256 means that a maximum of 2 routes can be used regardless of the respective locations of the EPRs:

locally within a UCX: either via the 0-ring or via the 1-ring;

directly between 2 UCXs: either via the 2 0-rings or via the 2 1-rings; and transiting via a UCX: either via the 3 0-rings or via the 3 1-rings.

The following abbreviations are defined:

the caller terminal is referenced Dr, and the called terminal is referenced De; Dr and De are generally physical identifiers;

AcDr designates the network access point to which the EPR at the caller end is connected;

AcDe designates the access point to which the EPR at the called end is connected;

[X] designates the self-routing address contained in the VPI field for routing the cells from the caller terminal to the called terminal;

[Y] designates the self-routing address for going from the called terminal to the caller terminal;

i_a0 designates the number of a node as seen by the 0-ring; and i_a1 designates the number of a node as seen by the 1-ring.

In other words:

[X] identifies the virtual path between the access point AcDr and the access point AcDe; and

[Y] identifies the virtual path between the access point AcDe and the access point AcDr.

The VCI codes required for peripheral switching and identifying the connections between the terminals are referenced as follows:

In the direction going from the caller terminal to the called terminal:

(p): VCI code allocated by the called EPR for identifying the virtual connection at the called EPR end; and (m): VCI code allocated by the caller EPR for identifying the same virtual connection at the caller end;

(m) being translated into (p) at the caller EPR end.

In the direction going from the called terminal to the caller terminal:

(q): VCI code allocated by the caller EPR for identifying the virtual connection at the caller EPR end; and (n): VCI code allocated by the called EPR for identifying the same virtual connection at the called end;

(n) being translated into (q) at the called EPR end.

Setting up a call includes inter alia the following steps:

Managing connections at the periphery

During setting-up of the connection in the direction from the caller terminal to the called terminal:

a) the VCI (m) is written in the translation memories of the matrices of the caller EPR; and b) the VCI (p) is written in the translation memories of the matrices of the called EPR.

During clearing-down of the connection, (n) and (p) are erased from the translation memories.

During setting-up of the connection in the direction going from the called terminal to the caller terminal:

a) the VCI (n) is written in the translation memories of the matrices of the called EPR; and b) the VCI (q) is written in the translation memories of the matrices of the caller EPR.

During clearing-down of the connection, (n) and (q) are erased from the translation memories.

The preceding paragraph mentions 2 VCI per direction: (m) then (p) in the go direction (caller terminal to called terminal), and (n) then (q) in the return direction (called terminal to caller terminal).

Starting from a given EPR, a plurality of connections may be set up simultaneously: these connections may carry the same VCIs insofar as said VCIs are allocated by the destination EPRs without consultation therebetween. But, in order to clear-down the connections independently from one another, it must be possible to identify them individually in the starting EPR: this is the task of the starting VCI allocated to connection set-up by the transmitter EPR.

Managing connections by the control member

This concerns seeking routes and is performed by calculating self-routing codes.

The codes are calculated on the basis of the physical identities of the accesses to which the caller EPR and the called EPR are connected, taking into account the image of the network that possesses the control member.

The physical identities of the accesses AcDr and AcDe are sent by means of signalling messages interchanged by the terminals and by the control member during setting-up of the call. This control member possesses the physical image of the network and the memory at any time of all of the connections set-up and of the parameters thereof: number, routes followed, possible back-up routes, and loads on all of the multiplex links. Among the different possible routes between the AcDr and the AcDe, the control member makes a choice as a function of criteria of the following type: load, distance, transit time, etc. which results in proposing self-routing codes to each of the ends (the caller end and the called end). Each of the ends receives at least one code, but it may receive a plurality of codes, some of which designate back-up routes that each terminal might have cause to use in the event of an operating anomaly: e.g. a link being cut off, or accidental traffic overload occurring.

In the remainder of the description, when mentioned is made of codes in the form of decimal numbers, reference is made to the tables in Appendix 1.

The following principles assume that the stage prior to initialization has been performed, i.e. updating the translation memories of all of the MCXs in all three UCXs, the data to be loaded complying with the contents of the tables in Appendix 1.

Local addressing in a UCX

An EPR addresses another EPR by using one of the two VPI codes allocated to the target EPR depending on whether the chosen route uses the 0-ring or the 1-ring, the selection criterion being the shortest route (measured in numbers of nodes through which the route passes) or the route which is the least heavily loaded. The bridge nodes cannot be directly addressed. Therefore, for a UCX having a capacity of 16 nodes including 14 EPRs, the number of codes required is 28. These 28 codes are the same inside each UCX (see Appendix 1).

When a plurality of EPRs are to address simultaneously the same target EPR (in other words, when connections are to be set up between terminals from different origins and terminals connected to the same EPR), they use the same VPI code. There is no risk of confusion insofar as the connections are identified in the terminal ends by VCIs which are necessarily different.

Direct addressing between 2 UCXs

In this case, a link is to be set up between 2 EPRs that do not belong to the same UCX. The VPI code used by the source EPR is a code that enables routing to be performed towards the bridge node of the source UCX connected to the bridge node of the sink UCX. This code is translated into a local VPI which is that specific to the target EPR. It can be noted therefore that an EPR must have 28 VPI codes for addressing the EPRs belonging to another UCX: 14 codes for a route using the 0-ring of the UCX source and then the 1-ring of the sink UCX. Combinations may also envisaged comprising the 0-ring then the 1-ring, and the 1-ring followed by the 0-ring: this would use up as many additional VPI codes.

Figure 10:
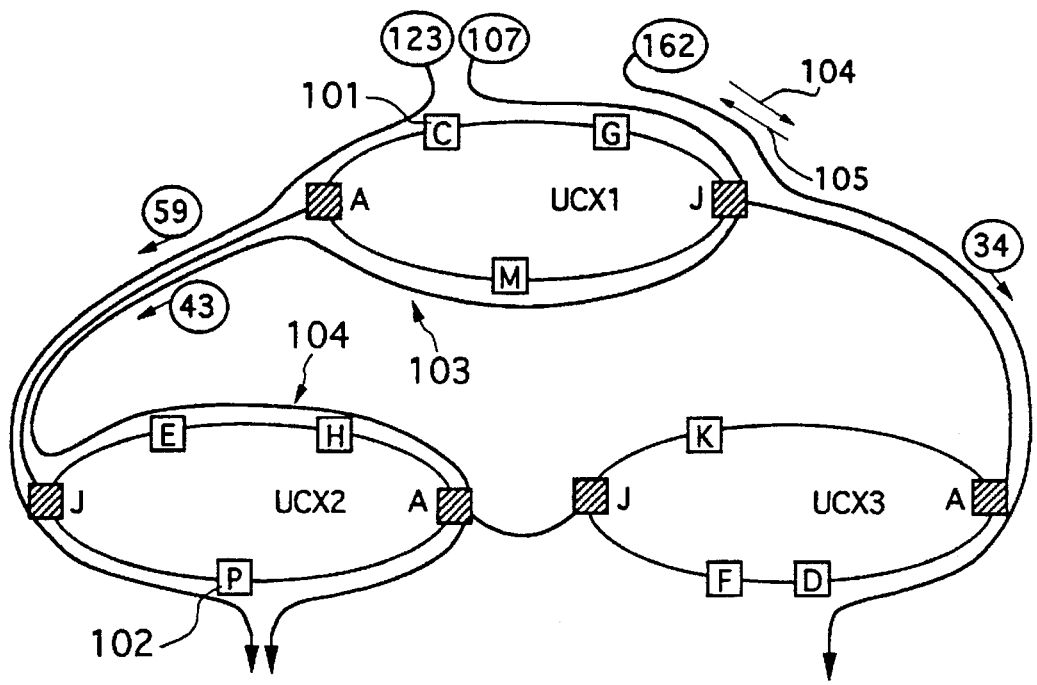
FIG. 10 is an example of a private site (main or remote) of a network as shown in FIG. 1, the site being composed of three distinct switching units.

FIG. 10 shows the two possible connections between the node (C) 10 of the UCX 103 and the node (P) 102 of the UCX2 104, one of the connections going via the 0-rings 104, and the other going via the 1-rings 105.

The cells carrying the VPI 107 are transmitted over the 0-ring of the UCX1. The bridge node (A) is programmed to output them and to translate the code 107 into a code 43. The node (J) of the UCX2 transmits these cells to the 0-ring, the code 43 designates the destination, which in this example is the node (P). The same technique is used to reach (P) via the 1-rings: the source code is 123, the translated code being 59. It is recalled that the codes are taken from the table in Appendix 1, and it can be noted that an addressing code between 2 UCXs can be deduced easily from the addressing code within a UCX.

More generally, considering an arbitrary UCX referred to as UCXn, and starting from this UCX:

1) in order to target a node in the UCXn+1, it is merely necessary to add the value 64 to the local identifier of the node (in the above example, 43+64=107 and 59+64=123); and 2) in order to target a node in the UCXn+2, it is merely necessary to add the value 128.

Addressing between 2 Ucxs by transiting via a third UCX

The architecture of the design makes it possible to perform routing between 2 UCXs by going via the third UCX. This is possible by allocating as many additional VPIs, in this example 28 codes per UCX to be reached after transiting via an intermediate UCX. The technique uses two translations, the first being performed in the bridge node of the source UCX, and the second being performed in the outgoing bridge node of the transit UCX.

Figure 11:
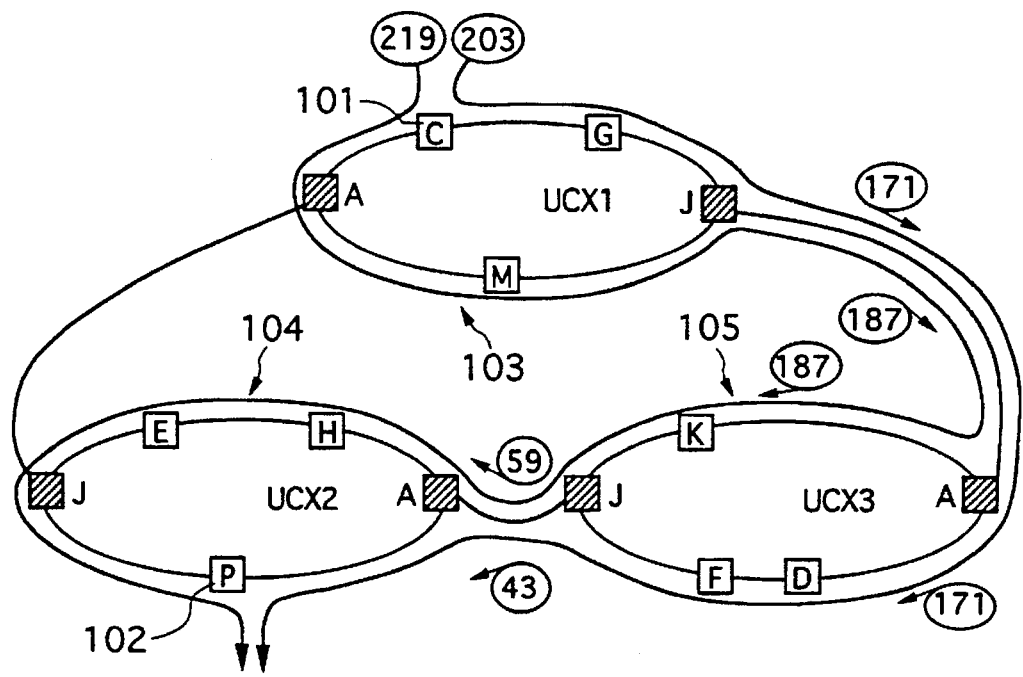
FIG. 11 shows cell transit between two switching units of the site shown in FIG. 10.

FIG. 11 shows the process required for reaching the node (P) 102 of the UCX2 104 by starting from the node (C) 109 of the UCX1 103 and transiting via the UCX3 105.

The code 203 switches the cells over the 0-ring of the UCX1 to the node (J) which directs it towards the UCX3 after translation into 171. Seen from the UCX3 this code makes it possible to target the node 43 of the adjacent UCX, in this example the node (P). It is the node (J) which performs the second translation from 171 to 43.

The code 219 also makes it possible to reach the node (P) by using the 1-rings. It can be noted that it is simple to find the code making transit possible. 128 is added to 43, then 32 to 171; in the same way, 59+128=187, 187+32=219.

As a general rule:

in order to follow the route UCXn, UCXn+1, UCXn+2 (i.e. UCX1, UCX2, UCX3 or UCX2, UCX3, UCX1 or UCX3, UCX1, UCX2), it is merely necessary to add 96 to the address of the target node; and in order to follow the route UCXn, UCXn+2, UCXn+1 (i.e. UCX1, UCX3, UCX2 or UCX2, UCX1, UCX3 or UCX3, UCX2, UCX1), it is merely necessary to add 160 to the address of the target node; this case is described above.

For example, if, starting from the UCX1, the node (P) of the UCX2 is to be reached by transiting via the UCX3:

a) via the 0-rings, the addresses are successively: 203, 171, and 43; and b) via the 1-rings, the addresses are successively: 219, 187, and 59.

The entire set of routing rules is summarized below:

To go from UCXn to UCXn+1 via the 0-rings: i-a0+64; and via the 1-rings: i-a1+64.

To go from UCX to UCXn+2 via the 0-rings: 1-a0+128; and via the 1-rings: i-a1 +128.

Transit: to do UCXn, UCXn+1, UCXn+2 via the 0-rings: i-a0+96; and via the 1-rings: i-a1+96.

Transit: to do UCXn, UCXn+2, UCXn+1 via the 0-rings: i-a0+160; and via the 1-rings: i-a1+160.

Setting up point-to-multipoint connections is a requirement of private local area networks. The apparatus described is capable of satisfying this requirement, even if the concept of self-routing might appear incompatible with the notion of broadcasting.

Two approaches may be envisaged:

1) The first consists in managing the multipoint connections without using the technique described, but rather by relying solely on the conventional technique of marking by VPI. The broadcast tree is built by marking all of the translation memories of the MCXs concerned. This unoriginal procedure suffers from the drawback of requiring a relatively large number of interchange operations. The MCXs at the center are VPI marked, and those in the peripheral equipment (EPR) are VCI marked.

2) The second approach consists in performing broadcasting in the center, and in managing the tree branch by branch in the EPRs. To remain compatible with the above-described apparatus, it is proposed to allocate 2 VPI codes reserved for broadcasting to each node, one code per ring. Any cell coming from an EPR and carrying one of the broadcasting codes is broadcast in the loop over the corresponding ring: after one complete lap, it is removed by the node via which it entered the loop.

It should be noted that flooding is not total, insofar as the tree uses only one ring per UCX.

Any broadcasting tree covers all three UCXs, the branches being set up at the sink EPRs in VCI mode.

Figure 12:
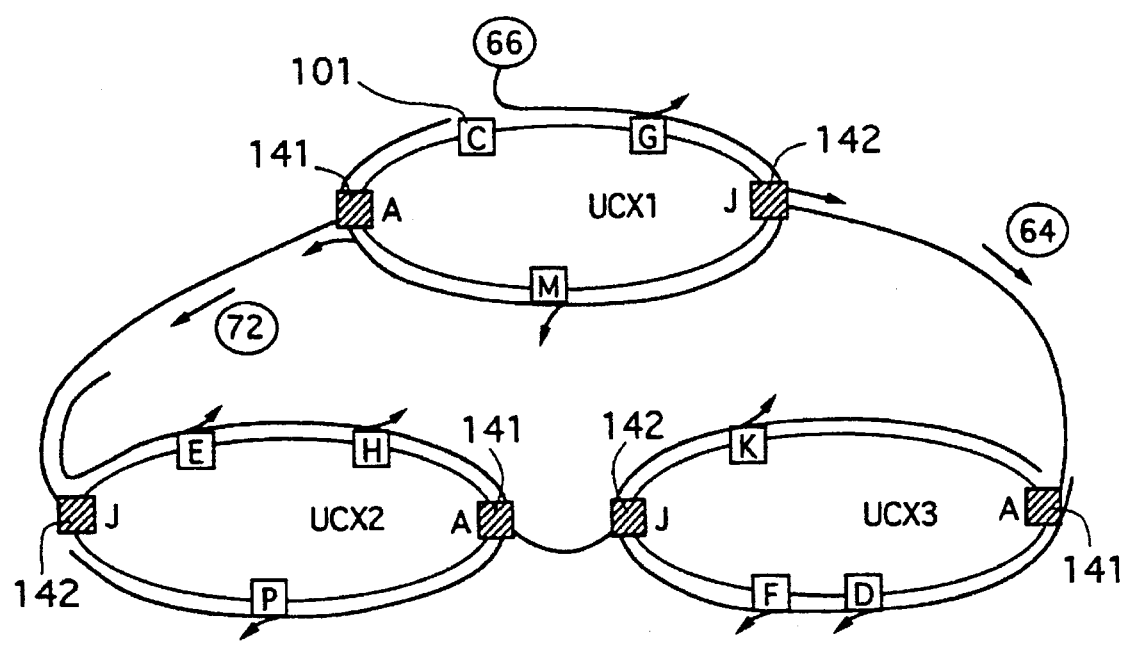
FIG. 12 shows cell broadcast in the switching units of the site shown in FIG. 10.

FIG. 12 shows the broadcasting technique starting form the node (C) 101 whose VPI code allocated for that purpose is 66 in this example (for broadcasting via the 0-rings).

The cells carrying the code 66 are transmitted over the 0-ring of the UCX1 and they are broadcast towards each output of the nodes, including the bridge nodes. The cells are removed via the input node 101 (C), this MCX having its translation memory programmed to perform this operation.

The bridge nodes 141 (A) and (J) 142 translate the code respectively into code 77 and into code 64. The cells 72 enter the UCX2 via the node (J), and the cells 64 enter the UCX3 via the node (A). These codes are broadcasting codes for the nodes A and J. The above-described process is therefore repeated in the UCX2 and the UCX3, the 2 input nodes removing the cells as soon as they have completed an entire lap. However, there is a difference with respect to the bridge nodes (A) for the UCX2 and (J) for the UCX3. They are programmed so that the cells are not broadcast at the outputs, the rule being that a bridge node receiving a broadcasting code allocated to a second bridge node does not broadcast it via its output. In this example, (A) of the UCX1 can broadcast 66 because it is allocated to an EPR node, but (A) cannot broadcast 66 because this code is allocated to the bridge node (J). This technique prevents cells from travelling indefinitely over the network.

To sum up:

receiving one of the codes (65, 66, 67, 68, 69, 70, 71, 73, 74, 75, 76, 77, 78, 79) via the 0-ring, a node (A) broadcasts it and translates it into 72; a node (J) broadcasts it and translates it into 64;

receiving one of the codes (81, 82, 83, 84, 85, 86, 87, 88, 89, 90, 91, 92, 93, 94, 95) via the 1-ring, a node (A) broadcasts it and translates it into 88; a node (J) broadcasts it and translates it into 80;

a node (A) receiving 64 via the 0-ring or 80 via the 1-ring removes the cell;

a node (J) receiving 72 via the 0-ring or 88 via the 1-ring removes the cell;

a node (A) receiving 72 via the 0-ring or 88 via the 1-ring merely provides transit; and a node (J) receiving 64 via the 0-ring or 80 via the 1-ring merely provides transit.

The above-described principle is applicable to a whole variety of network architectures provided that their sizes do not exceed a certain limit fixed by the number of possible codes (in this example, 256 for an 8-bit VPI field), and taking into account the level of defense that is set on initializing the network, i.e. the resistance to breakdown, in other words the number of back-up routes between each pair of access points.

For example:

in a loop having a single ring, only one route is possible;

in a loop having two rings, two routes are possible, and therefore 2 codes are required per node; and in a structure made of 2 2-ring loops, four routes are possible, and therefore 4 codes are required, etc.

Furthermore, the switching elements used in the design described (4×4 matrices) make it possible to build architectures having various topologies to which the mechanism described is also applicable:

a) loop having 1 or 2 rings;

b) conventional matrix stages, e.g. for implementing 16×16 switching units;

c) small switching units cascaded together; and d) concentration units of various capacities structured in matrix stages.

Moreover, the mechanism is applicable with larger-sized switching equipment (e.g. 16×16 matrices). Its advantages nevertheless become more difficult to justify insofar as such equipment is relatively bulky (at least one card), and therefore the memory area is no longer a problem. Furthermore, the number of messages required for marking is very small.

Architecture may also be provided that implements various types of equipment, e.g. a center built around 16×16 matrices and distribution networks based on 4×4 matrices.

APPENDIX 1: CODE ALLOCATION TABLES FOR THE DESIGN CONSIDERED

The codes identifying the nodes to which the EPRs are connected have been set arbitrarily as follows:

| Name of the MTX node (see FIG. 8) | i_a0 (code as seen by 0-ring) | i_a1 (code as seen by 1-ring) |
|---|---|---|
| B | 32 | 48 |
| C | 33 | 49 |
| D | 34 | 50 |
| E | 35 | 51 |
| F | 36 | 52 |
| G | 37 | 53 |
| H | 38 | 54 |
| K | 39 | 55 |
| L | 40 | 56 |
| M | 41 | 57 |
| N | 42 | 58 |
| P | 43 | 59 |
| R | 44 | 40 |
| S | 45 | 61 |

These codes apply for each UCX.

The MCXs referred to as A and J are the access bridges to the other UCXs.

Seen from an arbitrary node of the UCXn by the 0-rings, the nodes of the UCXn+1 posses the following codes:

| VPI | target node | i_a0 of the target node |
|---|---|---|
| 96 | B | 32 |
| 97 | C | 33 |
| 98 | D | 34 |
| 99 | E | 35 |
| 100 | F | 36 |
| 101 | G | 37 |
| 102 | H | 38 |
| 103 | K | 39 |
| 104 | L | 40 |
| 105 | M | 41 |
| 106 | N | 42 |
| 107 | P | 43 |
| 108 | R | 44 |
| 109 | S | 45 |

The translations from the original codes (on the left) to the target codes (on the right) are performed in the bridge node of the UCXn which connects the UCXn to the UCXn+1.

Seen from an arbitrary node of the UCXn by the 1-rings, the nodes of the UCXn+1 possess the following codes:

| VPI | target node | i_a1 of the target node |
|---|---|---|
| 112 | B | 48 |
| 113 | C | 49 |
| 114 | D | 50 |
| 115 | E | 51 |
| 116 | F | 52 |
| 117 | G | 53 |
| 118 | H | 54 |
| 119 | K | 55 |
| 120 | L | 56 |
| 121 | M | 57 |
| 122 | N | 58 |
| 123 | P | 59 |
| 124 | R | 60 |
| 125 | S | 61 |

Seen from an arbitrary node of the UCXn by the 0-rings, the nodes of the UCXn+2 posses the following codes:

| VPI | target node | i_a0 of the target node |
|---|---|---|
| 460 | B | 32 |
| 160 + j | — | 32 + j |
| 173 | S | 45 |

The translations between the original codes (on the left) and the target codes (on the right) are performed in the bridge node of the UCXn which connects the UCXn+2.

Seen from an arbitrary node of the UCXn by the 1-rings, the nodes of the UCXn+2 possess the following codes:

| VPI | target node | i_a1 of the target node |
|---|---|---|
| 176 | B | 48 |
| 176 + j | — | 48 + j |
| 189 | S | 61 |

In addition to the routing possibilities proposed above, there are those which make it possible to transit via an intermediate UCX.

Seen from an arbitrary node of the UCXn by the 0-rings, by transiting via the UCXn+1, the nodes of the UCXn+2 possess the following codes:

| VPI | target node | i_a0 of the target node | intermediate codes in the UCXn + 1 |
|---|---|---|---|
| 128 | B | 32 | 96 |
| 128 + j | — | 32 + j | 96 + j |
| 141 | S | 45 | 109 |

The translations between the original codes (on the left) and the intermediate codes (on the right) are performed in the bridge node of the UCXn which connects the UCXn to the UCXn+1. The translations between the intermediate codes and the target codes (in the middle) are performed in the bridge node of the UCXn+1 which connects the UCXn+1 to the UCXn+2.

Seen from an arbitrary node of the UCXn by the 0-rings, by transiting via the UCXn+2, the nodes of the UCXn+1 possess the following codes:

| VPI | target node | i_a1 of the target node | intermediate codes in the UCXn + 1 |
|---|---|---|---|
| 144 | B | 48 | 112 |
| 144 + j | — | 48 + j | 112 + j |
| 157 | S | 61 | 125 |

Seen from an arbitrary node of the UCXn by the 0-rings, by transiting via the UCXn+2, the nodes of the UCXn+1 possess the following codes:

| VPI | target node | i_a0 of the target node | intermediate codes in the UCXn + 1 |
|---|---|---|---|
| 192 | B | 32 | 160 |
| 192 + j | — | 32 + j | 160 + j |
| 205 | S | 45 | 160 |

Seen from an arbitrary node of the UCXn by the 1-rings, by transiting via the UCXn+2, the nodes of the UCXn+1 possess the following codes:

| VPI | target node | i_a1 of the target node | intermediate codes in the UCXn + 1 |
|---|---|---|---|
| 208 | B | 48 | 176 |
| 208 + j | — | 48 + j | 176 + j |
| 221 | S | 61 | 189 |

In all the above-described cases, when going from one UCX to another UCX, the cells use the same ring numbers. The principle does not prevent a change of ring, the constraint being merely additional consumption of codes. The number of available codes is defined by the number of bits of the field of the header used for that purpose. In our example, this number of bits is 8 because the self-routing address is conveyed by the VPI field. In the above tables, it can be noted that almost all of the 256 codes are used. In addition, changing rings is an option which, like transiting via an intermediate UCX, is quite justifiable for reasons of backing up operation (reconfiguration in the event of breakdown).

| | Codes allocated to broadcasting | |
|---|---|---|
| MCX | Broadcasting over 0-ring | Broadcasting over 1-ring |
| A | 64 | 80 |
| B | 65 | 81 |
| C | 66 | 82 |
| D | 67 | 83 |
| E | 68 | 84 |
| F | 69 | 85 |
| G | 70 | 86 |
| H | 71 | 87 |
| J | 72 | 88 |
| K | 73 | 89 |
| L | 74 | 90 |
| M | 75 | 91 |
| N | 76 | 92 |
| P | 77 | 93 |
| R | 78 | 94 |
| S | 79 | 95 |

We claim:

1. A method of forwarding data organized in data packets, in a multi-site data-interchange network for data organized in data packets, the network being of the type including at least two mutually distant sites, each of which is organized in private sub-networks including a plurality of terminals that are capable of transmitting and/or receiving packets, and that are interconnected via a distributed public network;

each of said packets comprising a header and a data field, said header containing at least two identifiers defining two access hierarchy levels as seen from said public network, namely a first identifier referred to as the "virtual channel identifier" (VCI) enabling switching of said packets to be controlled, and a second identifier referred to as the "virtual path identifier (VPI) enabling distribution of said packets to be controlled in said public network;

said method being characterized in that two tasks are assigned to said virtual path identifier, namely:
controlling distribution of the packet while it is travelling over said public network; and
managing a routing mechanism for routing the packet while it is travelling over one of said private sub-networks;

in that, each time a packet is transferred from one of said private sub-networks to said public network, routing data contained in said virtual path identifier is shifted to a reserved portion of said virtual channel identifier, and is replaced by distribution control data;

and in that, each time a packet is transferred from said public network to one of said private sub-networks, said distribution control data is erased, and said self-routing data contained in said reserved portion of said virtual channel identifier is shifted to said virtual path identifier.

2. A method according to claim 1, characterized in that: said virtual path identifier is constituted by 12 bits, the four most significant bits being forced to a predetermined value; and said virtual channel identifier is constituted by 16 bits, the eight most significant bits being reserved for storing said self-routing data.

3. A method according to claim 1, characterized in that said mutually distant sites comprise a main site and at least two secondary sites, and in that any call between two of said secondary sites goes via said main site.

4. A method according to claim 1, characterized in that the operations of modifying the contents of said virtual path identifier are performed physically in dedicated interface equipment on each site.

5. A method according claim 1, characterized in that each private sub-network includes:

a plurality of switching nodes connected together in pairs via at least one data interchange medium, each of said nodes serving a respective concentrator, each concentrator managing at least one data processing terminal capable of transmitting and/or receiving data packets; and an interface module providing the connection between said private sub-network and said public network;

and in that said method includes the following steps:

a data packet is transmitted by a transmitter terminal to its associated concentrator, referred to as the "transmitter" concentrator, and on to a receiver terminal, said packet carrying a local VCI (VC-La) and a local VPI (VP-La) allocated by said transmitter terminal for the duration of a call;

said local VCI is translated in said transmitter concentrator into a VCI (VC-Sa) allocated by said receiver terminal for the duration of a call;

said local VPI is translated in said transmitter concentrator into a VPI (VP-Sa) allocated permanently to said receiver terminal;

if said receiver terminal belongs to the same sub-network as said transmitter terminal:
said packet is routed to the "receiver" concentrator associated with said receiver terminal, via said switching nodes, by analyzing said VPI (VP-Sa); and
the packet is routed to said receiver terminal by analyzing said VCI (VC-Sa) in said receiver concentrator; and if said receiver terminal belongs to another sub-network:
said packet is routed to the interface module of the sub-network of said transmitter terminal, via said switching nodes, by analyzing said VPI (VP-Sa);
in said interface module, the contents of said VPI (VP-Sa) are shifted to a reserved portion of the VCI field, and management information (VP-Bx) concerning managing the distribution over the public network is written in the VPI field;
said interface module transmits said packet to the sub-network of said receiver terminal via said public network;
said packet is received in the interface module of the sub-network of said receiver terminal;
in said interface module, the contents of said reserved portion of the VCI field are shifted to said VPI (VP-Sa);
said packet is routed to the "receiver" concentrator associated with said receiver terminal via said switching nodes, by analyzing said VPI (VP-Sa); and
said packet is routed to said receiver terminal, by analyzing said VCI (VC-Sa) in said receiver concentrator.

6. A method according to claim 1, characterized in that each private sub-network includes a plurality of switching nodes connected together in pairs via at least one data interchange medium, and further characterized in that said routing data placed in said virtual path identifier is an identifier designating at least one receiver terminal, each of said terminals having an identifier which is specific to it in a given sub-network; wherein each switching node is associated with:

a memory containing at least one group of at least one identifier corresponding to a set of at least one terminal associated with said node; and a switching matrix associating at least one input with at least two outputs, namely;
at least one first output corresponding to at least one of said stations associated with said node; and
at least one second output corresponding to the following node on said private sub-network;

said method further characterized in that each matrix receiving a packet systematically selects said second output of the switching matrix if the identifier of the packet does not correspond to any of the identifiers contained in the memory, and said first output otherwise.

7. A method according to claim 6, characterized in that at least one of said sub-networks includes at least two switching units, each switching unit including a plurality of switching nodes interconnected in pairs via at least one data interchange medium, and at least one link node for linking to another switching unit, via a link bridge;

in that said identifier comprises two portions:
a first portion designating the destination switching unit; and
a second portion designating the destination terminal in said destination switching unit;

and in that, in each link node, the following steps are performed:
said first portion is analyzed; and
if the packet is to be transmitted via said link node to another switching unit, said first portion is modified accordingly, and said packet is transmitted.

8. A method according to claim 7, characterized in that each switching unit uses the same set of identifiers, corresponding to said second portion, and in that a predetermined value is added to said identifiers, the predetermined value corresponding to said first portion, to designate the destination switching unit.

9. A method according to claim 7, characterized in that it provides at least one identifier enabling the packet in question to be broadcast to at least two receiver terminals.

10. A multi-site data packet communications network, the network being of the type including at least two mutually distant sites, each of which is organized in private sub-networks including a plurality of terminals that are capable of transmitting and/or receiving packets and that are interconnected via a distributed public network; each of said packets comprising a header and a data field, said header containing at least two identifiers defining two access hierarchy levels as seen from said public network, namely a first identifier referred to as the "virtual channel identifier" (VCI) enabling switching of said packets to be controlled, and a second identifier referred to as the "virtual path identifier" (VPI) enabling distribution of said packets to be controlled in said public network; said VPI controlling distribution of the packet while it is travelling over said public network and managing a routing mechanism for routing the packet while it is travelling over one of said private sub-networks, wherein each time a packet is transferred from one of said private sub-networks to said public network, routing data contained in said virtual path identifier is shifted to a reserved portion of said virtual channel identifier, and is replaced by distribution control data, wherein each time a packet is transferred from said public network to one of said private sub-networks, said distribution control data is erased, and said self-routing data contained in said reserved portion of said virtual channel identifier is shifted to said virtual path identifier, and wherein at least one of said sub-networks includes at least two switching units, each switching unit including a plurality of switching nodes interconnected in pairs via at least one data interchange medium, said network being further characterized in that each of said switching nodes includes a switching matrix associated with a memory for storing a set of identifiers.

11. A network according to claim 10, wherein each of said nodes serves a respective concentrator, each concentrator managing at least one data processing terminal capable of transmitting and/or receiving data packets, said network bring further characterized in that said switching matrices are similar to those used in the concentrators of said network.

12. A network according to claim 10, characterized in that said memories include a fixed addressing table.

13. A network according to claim 10, characterized in that at least some of said switching units are organized using topography having two counter-rotary rings.

14. An interface module for providing connection between a private sub-network and a distributed public network, in a multi-site data-interchange network for data organized in data packets, the network being of the type including at least two mutually distant sites, each of which is organized in private sub-networks including a plurality of terminals that are capable of transmitting and/or receiving packets, and that are interconnected via said public network; each of said packets comprising a header and a data field, said header containing at least two identifiers defining two access hierarchy levels as seen from said public network, namely a first identifier referred to as the "virtual channel identifier" (VCI) enabling switching of said packets to be controlled, and a second identifier referred to as the "virtual path identifier" (VPI) enabling distribution of said packets to be controlled in said public network; said virtual path identifier controlling distribution of the packet while it is travelling over said public network and managing a routing mechanism for routing the packet while it is travelling over one of said private sub-networks, said module including means, each time a packet is transferred from one of said private sub-networks to said public network, for shifting routing data contained in said virtual path identifier to a reserved portion of said virtual channel identifier, and for replacing said routing date with distribution control data; and means, each time a packet is transferred from said public network to one of said private sub-networks, for erasing said distribution control data and shifting said self-routing data contained in said reserved portion of said virtual channel identifier to said virtual path identifier.

* * * * *